July 19, 1960 K. W. SVENSSON 2,945,506
CONTROL VALVE, PARTICULARLY FOR AIR JACKETS
Filed June 22, 1956
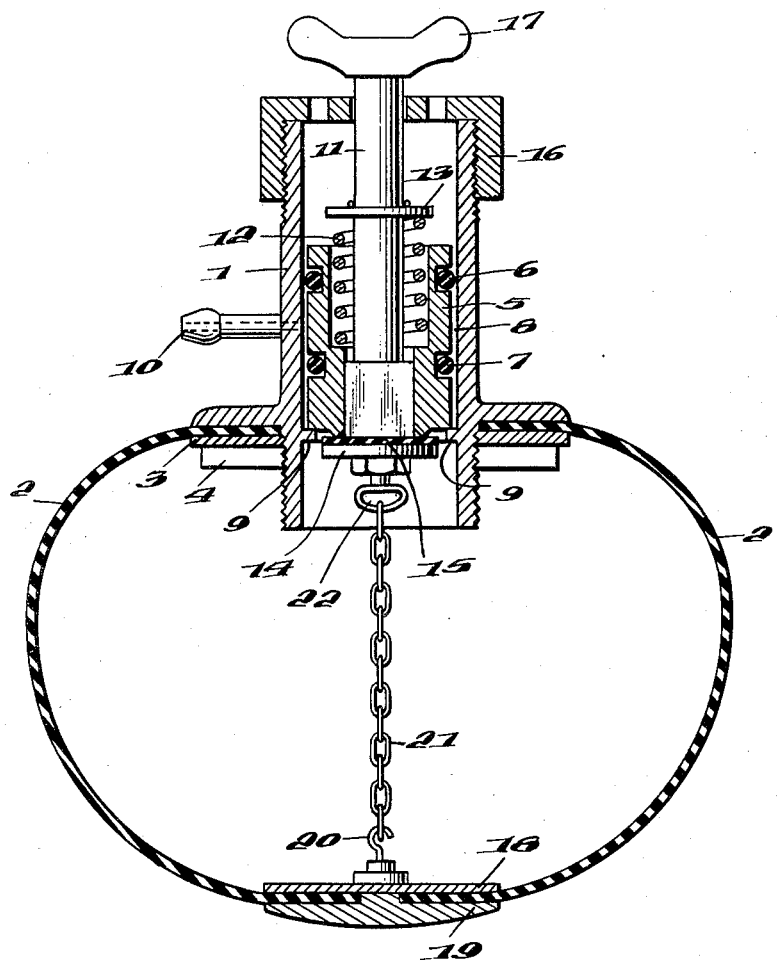
INVENTOR
KNUT WILHELM SVENSSON,
BY *Lawson and Taylor*
ATTORNEYS

United States Patent Office 2,945,506
Patented July 19, 1960

2,945,506

CONTROL VALVE, PARTICULARLY FOR AIR JACKETS

Knut Wilhelm Svensson, Lidingö, Sweden, assignor to Svenska Aktiebolaget Gasaccumulator, Lidingö, Sweden, a corporation of Sweden Filed June 22, 1956, Ser. No. 593,162

Claims priority, application Sweden June 23, 1955

3 Claims. (Cl. 137—226)

The present invention refers to a control valve, which is particularly intended for use in an air jacket for under-water work. In under-water work it is desirable for reasons of safety that the diver be fitted out with an air jacket, which can be inflated in a single and reliable manner, for instance with compressed air, so that the diver will be able even in an emergency situation to be certain to reach the surface. For this reason it is of prime importance that an air jacket should be provided with a valve for controlling a supply conduit for the jacket. Furthermore, the air jacket should be provided with valve mechanisms that maintain its volume substantially constant, particularly during the ascension to the surface, irrespective of the fact that the counter-pressure of the surrounding water diminishes continuously during the ascension. Finally, it is preferable that the air jacket be provided with some sort of valve allowing the diver to let out excess air manually, thus to control the buoyancy of the jacket.

All of these functions are made possible by the valve according to the invention, which is characterized by a valve member displaceable in a valve housing in one direction for opening a pressure-gas supply conduit and responsive to volume-sensitive means connected with the air jacket so as to close the supply conduit when the jacket volume reaches a certain value. The valve member further comprises an outlet conduit, which is adapted to be opened by the volume-sensitive means upon the said volume having been exceeded as well as manually. The valve member preferably comprises a piston axially displaceable within the valve housing and which is urged by the volume-sensitive means against a shoulder provided in the valve housing, thereby to shut off the supply conduit. Furthermore, there is provided in the valve housing an axially displaceable flanged rod, which is spring-urged towards the valve member to form a valve which maintains the outlet conduit closed. This valve is actuable either by the volume-sensitive means or manually so as to open the outlet conduit.

On the annexed drawing there is shown a control valve according to the invention in section and inserted into a schematically illustrated air jacket.

The valve comprises a valve housing 1, which is inserted into an aperture in the air jacket 2 and is held tightly therein by means of a washer 3 and a nut 4. Within the housing a valve member 5 is axially displaceable, sealing rings 6 and 7 being provided between the valve member and the inside of the valve housing forming an annular space 8 therebetween. The movement of the valve member in one direction is limited by shoulders 9 provided on the inside of the valve housing and located in such a way that the annular space 8 is opposite an inlet conduit 10 when the valve member rests on the shoulders. The inlet conduit is thus held closed between the pair of sealing rings 6 and 7 and prevents the pressure gas from reaching either the jacket or the atmosphere.

Within the valve member there is provided a rod 11 and a compression spring 12 is inserted between an inner shoulder of the valve member and a flange 13 provided on the rod 11. By means of this spring a second flange 14 of the rod 11 is urged against an annular edge, which is formed at one end of the valve member, whereby an outlet valve is formed between the last-mentioned flange and the valve member. A rubber disk 15 is inserted for tightening purposes between the flange and the annular edge. The lower portion of the rod 11 is preferably constructed with a square cross section, the aperture of the valve member 5 being however of circular cross section, whereby channels are formed between the rod and the valve member allowing passage of the gas when the outlet valve is opened. At the other end of the rod 11 extending through a hole of a cap 16, which is screwed onto the valve housing, there is attached a handle 17 for actuating the rod 11 and thus also the valve member 5.

In the position shown in the drawing, in which the valve member rests on the shoulders 9, both the inlet conduit 10 and the outlet conduit containing the outlet valve are held closed and it may be assumed that the air jacket is not yet inflated. If the valve member is displaced, for instance through a pull exerted on the handle 17, so as to make the flange 13 rest against the cap 16, the sealing ring 7 passes the inlet conduit 10 and thus permits free access of the pressure gas to the air jacket. When a certain amount of gas has flown into the jacket, the valve member is again displaced against the shoulder 9 and closes the supply conduit 10 and the gas quantity supplied is now retained in the jacket. If a greater pressure is exerted on the handle 17 the rod 11 can then be displaced relative to the valve member 5, so as to open the outlet valve and let out again a desired volume of gas from the jacket.

The control of the gas quantity admitted or the release of excess gas, respectively, may take place either manually by means of the handle 17 or through means that are sensitive to the volume of the air jacket and control the valve accordingly. An example of such means is shown in the drawing in the form of a hook 20, which is threadedly connected with the opposite wall of the jacket by means of disks 18 and 19, the hook being connected through a chain 21 or the like with an eyelet 22 attached to the rod 11. In the deflated condition of the jacket, the chain 21 is slack and cannot influence the valve mechanism, so that free displacement of the valve member is possible in a direction permitting the pressure gas to be blown into the jacket. When the desired volume has been reached, the wall of the jacket opposite to the valve is urged away by the pressure, tightening the chain 21 and pulling the valve member against the shoulders 9 so as to close the supply conduit 10. If the surrounding pressure then decreases in the course of the diver's ascension, tending to further increase the volume of the air jacket, the opposite wall is urged further away and causes the outlet valve to open and let out the excess air. The volume of the jacket is thus held constant during the entire course of the ascension, whereby a constant rate of ascension is assured the diver. At the same time it is always possible for him by pressing the handle 17 to let out still more gas and thus diminish the jacket's buoyancy, if he wishes for some reason or other to interrupt the ascension. He may then by either pressing or pulling the handle 17 as he desires let out more gas or refill the jacket, so that he either descends further or resumes the ascension to the surface.

What I claim is:

1. In combination, a control valve and an air jacket comprising, a valve housing having a gas inlet and a gas outlet, said valve housing being mounted in a wall of the air jacket, a piston slidably disposed between two end positions within said housing, means responsive to the volume of gas within said jacket for moving the piston from one end position in which said gas inlet is in communication with the air jacket to the other end position in which the gas inlet is closed, a central axial bore in said piston providing a communication to said gas outlet, an outlet valve mounted on said piston for closing said axial bore and connected to said volume responsive means, said outlet valve being actuated by said volume responsive means for opening said outlet valve when said volume exceeds a predetermined value.

2. A device according to claim 1 including a shoulder on the valve housing, said piston adapted to seat against said shoulder in the end position of said piston in which said gas inlet is closed.

3. A device according to claim 1 wherein said volume responsive means includes a rod slidably disposed in the axial bore in said piston.

References Cited in the file of this patent

UNITED STATES PATENTS

| 10,018 | Locke | Jan. 31, 1882 |
| 1,737,428 | Mercur | Nov. 26, 1929 |
| 2,026,249 | Pierson | Dec. 31, 1935 |
| 2,221,482 | Jones | Nov. 12, 1940 |
| 2,591,120 | Blease | Apr. 1, 1952 |

FOREIGN PATENTS

| 623,231 | France | Mar. 14, 1927 |